United States Patent [19]

Lardi et al.

[11] 4,002,065
[45] Jan. 11, 1977

[54] STEAM TURBINE VALVE POSITIONING SYSTEM HAVING THROTTLE VALVE TEST CAPABILITY

[75] Inventors: Francesco Lardi, Pittsburgh; Uri G. Ronnen, Monroeville, both of Pa.

[73] Assignee: Westinghouse Electric Corporation, Pittsburgh, Pa.

[22] Filed: June 27, 1975

[21] Appl. No.: 591,245

[52] U.S. Cl. .................................. 73/168; 73/4 R; 415/16
[51] Int. Cl.² ........................................ G01L 27/00
[58] Field of Search ................ 73/4 R, 168; 415/16

[56] References Cited
UNITED STATES PATENTS

| | | | |
|---|---|---|---|
| 2,617,438 | 11/1952 | Doran | 415/16 |
| 2,866,470 | 12/1958 | Hold et al. | 415/16 |
| 3,552,872 | 1/1971 | Giras et al. | 415/7 |
| 3,744,311 | 7/1973 | Kalverboer | 73/168 |

*Primary Examiner*—Richard C. Queisser
*Assistant Examiner*—Frederick Shoon
*Attorney, Agent, or Firm*—H. W. Patterson

[57] ABSTRACT

A digital electrohydraulic steam turbine control system that generates a feedforward total steam flow demand signal to position the governor valves singly or sequentially in accordance with a dynamic nonlinear representation of steam flow vs. valve lift position having provision for testing the throttle valves while the turbine is operating in either the single or sequential mode and without effectively disturbing the load on the turbine and without the necessity of turbine operational feedback loops in service, is disclosed. Decremental and incremental flow changes for each of the governor valves in the test path and the non-test path, respectively, are calculated iteratives in accordance with a non-linear valve flow vs. valve lift position characterization for the total steam flow to the turbine. Subsequent to the test, the control valves are repositioned to the normal pretest sequential or operating mode by incrementally changing the flow of all the valves toward the normal operating mode position so that the net total flow is unchanged.

13 Claims, 14 Drawing Figures

REHEAT STOP VALVE-RSV
INTERCEPTOR VALVE - IV

STEAM TURBINE VALVE POSITIONING SYSTEM HAVING THROTTLE VALVE TEST CAPABILITY

BACKGROUND OF THE INVENTION

In the operation of steam turbines for electric power plants, variations in load on the turbine are determined by controlling the steam flow through control or governor valves. Upstream of the governor valves, are throttle valves or stop valves. The throttle valves in some installations are used to control the turbine during start-up, at which time, the control or governor valves are fully open. In the turbine installations where stop valves are located upstream of the governor valves, the stop valves are fully opened during start-up; and the steam flow is controlled by the governor valve. In both types of installations, the throttle valves or the stop valves, as the case may be, are rapidly closed, to shut down the turbine in response to a contingency causing a turbine trip. However, once the turbine is placed in load operation, the throttle valves, or the stop valves are fully opened, with any variation in steam flow being controlled solely by the control or governor valves.

The period of uninterrupted load operation of the turbine, and therefore, the period of inactive throttle or stop valves opertion, can be several months or more. Therefore, tests of the throttle or stop valves may be required, periodically, such as once a week, or even once a day, for example, in order to insure that such throttle or stop valves are operable in the event of required closure under contingency situations.

In one typical valve arrangement for a turbine installation, each of two single-ended steam chests supply turbine steam through four governor valves. A single throttle valve supplies steam to each steam chest from the plant steam source. An electrohydraulic controller positions the eight governor valves for variation in turbine load while the two throttle valves are held in their wide-open position.

To test a throttle valve associated with one of the steam chests, it is necessary first to close the governor valves downstream from that throttle valve, then make a test closure of the throttle valve, and reopen the throttle valve; and finally reopen the associated governor valves. The same procedure is repeated for the second stream chest. Governor valve closure prior to throttle valve closure is necessary to aviod a high steam pressure drop across the test throttle valve when it is closed since throttle valves typically are not reopenable against high steam pressure. On the other hand, governor valves can be reopened against high steam pressure since they typically operate with balanced valve plug forces.

In initiating, performing, or terminating such throttle or stop valve tests, it is desirable that there be no disturbance to the required load or total steam flow to the turbine. Also, it is desirable that such a test may be performed while the turbine is operating in either the single valve mode or the sequential valve mode without the necessity of turbine operational feedback loops being in service. Of course, depending on the number of throttle or stop valves associated with a particular turbine installation, the load on the turbine must be below a predetermined maximum such that the total desired flow of steam can be accommodated by parallel connected valves not under test. If required, the predetermined maximum load would be met by the taking up of the additional load by another turbine prior to the test.

In conventional feedback analog turbine control systems, governor valve closure for the test procedure is accomplished by the application of an electrical test bias signal to the electrohydraulic controllers for those governor valves associated with one steam chest. As the governor valves are closed, an impulse pressure feedback control automatically causes the remaining governor valves in the other steam chest to open wider and meet the load demand as the governor valves involved in the throttle valve test are closed. Alternatively, a manual control input can be used to raise the load demand signal artificially high so that the remaining governor valves more or less provide the load actually desired. Once the throttle valve test is completed, the test bias is removed from the associated governor valve controllers and turbine load operation is returned to normal. Thus, throttle valve testing can typically be performed with existing electrohydraulic feedback control systems substantially without disturbing existing load. Further, throttle valve testing can typically be initiated in either the sequential or the single valve mode of governor valve operation. Following a test, the governor valves in the one steam chest are reopened, and all governor valves smoothly move under feedback control to the positions required to satisfy load demand in the pretest governor valve mode.

A throttle or stop valve test system is proposed in copending U.S. Patent Application Ser. No. 388,534, filed Aug. 15, 1973 by Uri G. Ronnen and Francesco Lardi for a digital electrohydraulic turbine control system which generates a feedforward representation of desired total steam turbine flow. As a part of this digital electrohydraulic system, a valve positioning system is governed by the total steam flow representation to calculate dynamically a nonlinear characterization of steam flow vs. valve lift position for each of the governor valves in a selected single or sequential mode of valve operation. This valve positioning system functions to transfer from one valve mode to another without effectively disturbing the total steam flow to the turbine. However, the valve test system of the copending application include a linear bypass system in the program digital computer which functions to control the governor valves which are taking up the steam flow at times when the governor valves in the test path are being closed preparatory to such throttle valve test, and the turbine operative feedback loops are required to be in service. The special bypass linear demand function or subroutine for testing is rendered inactive when the nonlinear valve system or subroutine returns to its normal operation after a valve test. This nonlinear valve positioning routine or system is provided with a tracking function and the necessary inputs for generation of feedforward valve position demand representation which conform to existing valve position at the termination of the test. Thus, the transfer from normal automatic operation to test operation and back to normal operation is accomplished bumplessly in the system of the copending application.

Although the stop or throttle valve test system in the copending application is effective, and does not disturb the load on the turbine, it is desirable to be able to provide such a system that uses a feedforward signal and does not require feedback loops to be in service to achieve a smooth valve test, or require the additional valve test hardware. It is also desirable to be able to initiate the valve test during either the single or sequential mode of operation.

SUMMARY OF THE INVENTION

The present invention relates to an improved valve test system for a digital electrohydraulic turbine control system that generates a feedforward total turbine steam flow demand representation. A valve position demand representation is generated which is characterized by a nonlinear curve of valve position vs. steam flow. The decrease in flow which would occur upon closure of the control valves in the downstream steam path of the valve to be tested is calculated; and such decrease is used to calculate the increase in flow for the control valves which are used to take up the excess flow. All of the control valves are repositioned in accordance with the nonlinear characterization of the calculated decreases and increases of flow demand vs. valve lift position from either a sequential or single pre-test operating mode.

More specifically, the decrease in the flow of the valves in the test path and the increase in the flow of the valves not in the test path is calculated in predetermined increments and the valves are repositioned in accordance with each calculated increment. In the event the increments for the valves not in the test path exceed the maximum flow for a respective valve while operating in the sequential mode, such increment is used to position the next valve in the operating sequence.

DESCRIPTION OF THE PREFERRED EMBODIMENT

Figure 1:
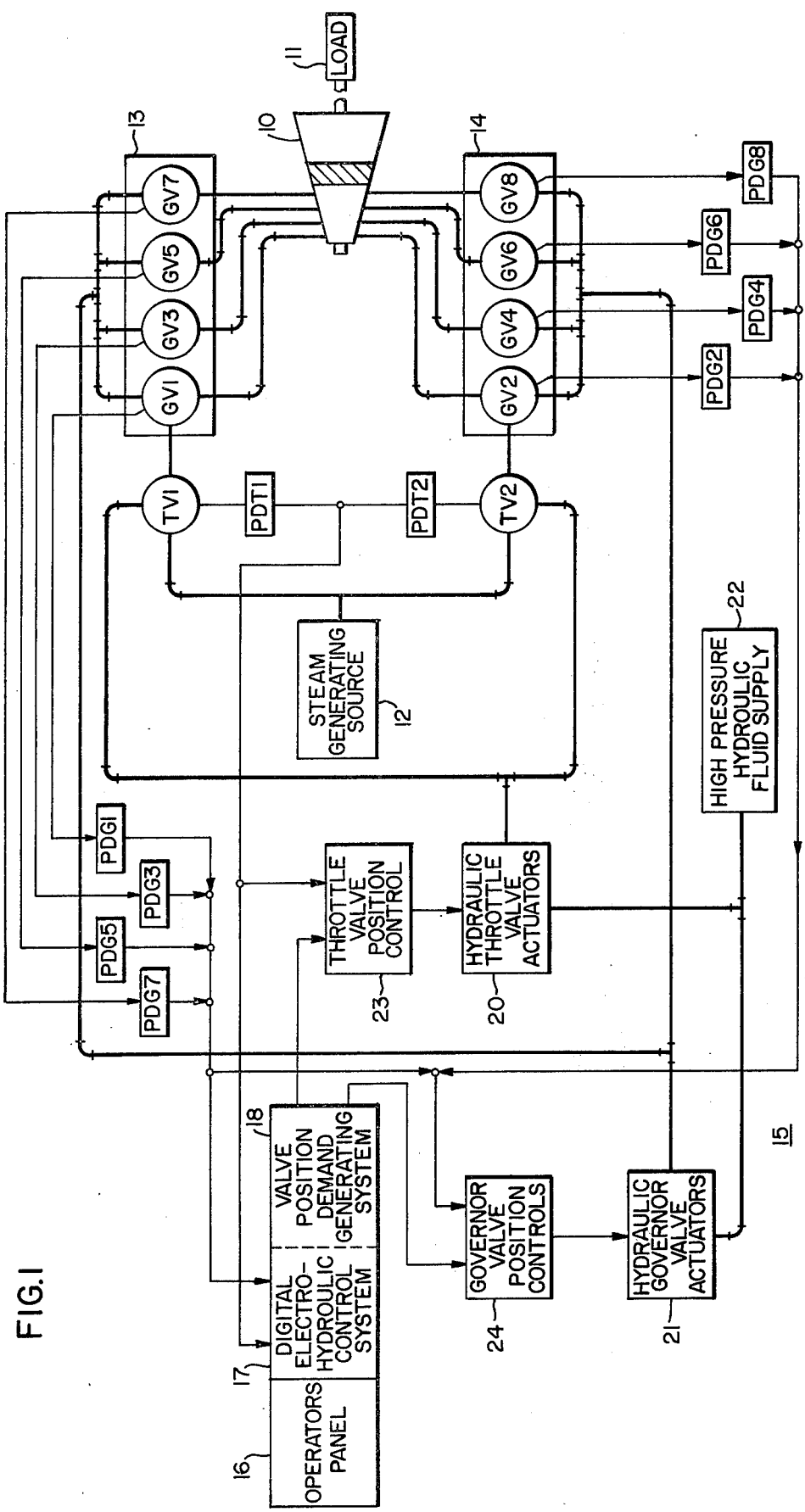
FIG. 1 is a schematic diagram of a turbine system arranged in accordance with the principles of the invention.

Referring to FIG. 1, a high-pressure turbine section 10 is operably connected in a well known manner to drive a load referred to at 11. A steam generating source 12, which may, for example, be provided in the form of a conventional drum or a once-through type boiler operated by fossil fuel, such as pulverized coal, natural gas, or oil, generates the steam for the high-pressure turbine section 10. Although only the high-pressure turbine section is shown, it is understood that it may include an intermediate presure section and/or a low pressure section (not shown). The turbine section 10, in the present embodiment, employs steam chests 13 and 14 which are of the single-ended type. The steam flow from the source 12 is directed to the turbine steam chests 13 and 14 through two throttle inlet valves TV1 and TV2. Steam is directed from the admission stem chests 13 and 14 to the high-pressure section 10 through eight governor valves GV1 through GV8 inclusive which are arranged to supply steam to inlets arcuately spaced about the turbine high pressure casing to constitute a typical governor valve arrangement for large fossil fuel turbines. The steam from the steam chest 13 is controlled by the governor valves GV1, GV3, GV5 and GV7; while the steam from the steam chest 14 is controlled by the governor valves GV2, GV4, GV6 and GV8. Nuclear turbines, on the other hand, typically utilize only four governor valves. Generally, various turbine inlet valve configurations, such as shown in FIGS. 2A through 2D, now involve different numbers and/or arrangements.

The throttle valves TV1 and TV2, and the governor valves GV1 through GV8 of the described embodiment of the invention are controlled by a control system 15 of the type disclosed in a copending patent application Ser. No. 247,877, entitled "System For Starting, Synchronizing And Operating A Steam Turbine With Digital Computer Control", filed by R. Uram on Apr. 26, 1972 and assigned to the present assignee, which application is incorporated herein by reference for a more detailed understanding thereof.

The control system 15 generally includes an operator's panel referred to at 16 and a digital electrohydraulic control system 17, which includes a valve position demand generating system 18, which is structured to respond to a feedforward representation of total turbine steam flow demand for generating a dynamic nonlinear representation of steam flow versus valve lift position for each of the steam inlet valves in either a single or sequential operating mode. The details of such valve position demand generating system are included in copending application Ser. No. 478,815, entitled "Improved System And Method For Operating A Turbine Powered Electrical Generating Plant In A Sequential Mode," filed by Uri G. Ronnen on June 10, 1974, and assigned to the present assignee, which is incorporated herein by reference and which is a continuation of application Ser. No. 306,979 filed Nov. 15, 1972.

An hydraulically operated throttle valve actuator, referred to at 20, is provided for each of the throttle valves TV1 and TV2. An hydraulic governor valve actuator, referred to at 21 is provided for each of the governor valves GV1 through GV8. A high-pressure hydraulic fluid supply 22 provides the controlling fluid for actuator operation. The operation of the throttle valve actuator 20, the governor valve actuator 21, and the high-pressure hydraulic fluid supply 22 for operating the throttle and governor valves is well known in the art. Each of the hydraulic valve actuators referred to generally at 20 and 21 for the individual steam inlet valves is operated by respective electrohydraulic position controls referred to at 23 and 24, which forms part of the control system 15. A well known local analog electrohydraulic valve position control loop is provided for each of the throttle and governor valves. Each control loop includes an associated valve position detector PDT1 and PDT2 for the throttle valves, and valve position detectors PDG1 through PDG8 inclusive for each of the similarly numbered governor valves GV1 through GV8, respectively. The valve position detectors are provided to generate respective valve position feedback signals which are combined with respective valve position signals from the valve position demand generating system 18 to position each of the respective valves in accordance with the valve position demand signals. A local analog electrohydraulic valve position control loop for each of the valves may be included in the control system 15 even though the control system 17 includes a programmed digital computer.

The steam turbine control system 15, in actual practice, will include feedback loops which include a throttle pressure detector, a speed detection system, and a megawatt detection system, for example, However, inasmuch as the system of the present invention does not require such feedback loops to be in operation for the system of the present invention to operate effectively, they have been omitted for the sake of brevity.

Figure 2A:
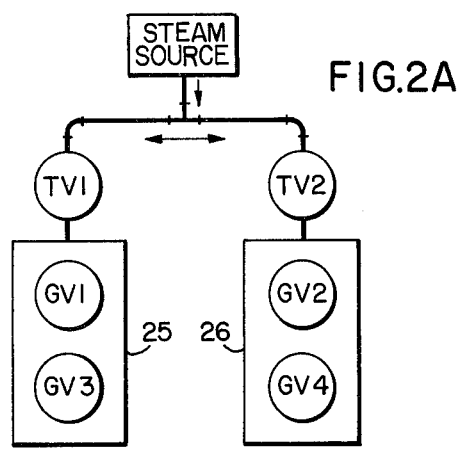
FIGS. 2A through 2D illustrate schematically typical turbine inlet valve arrangements which may be used in the system of the present invention.
Figure 2B:
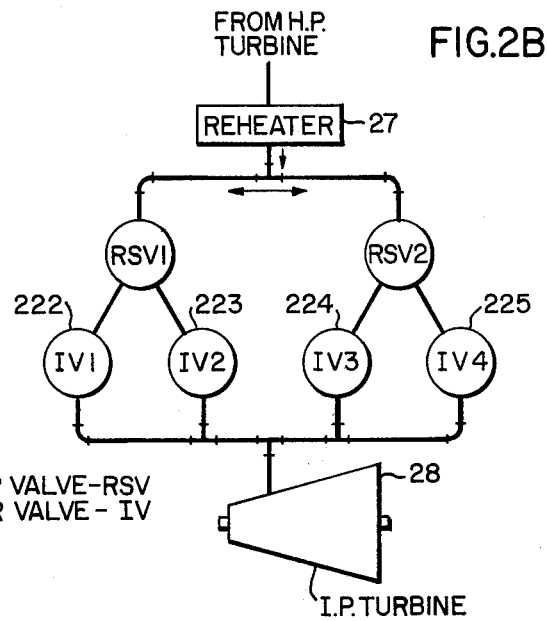
Figure 2C:
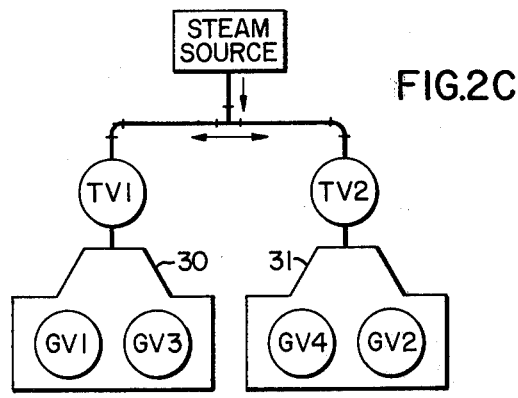
Figure 2D:
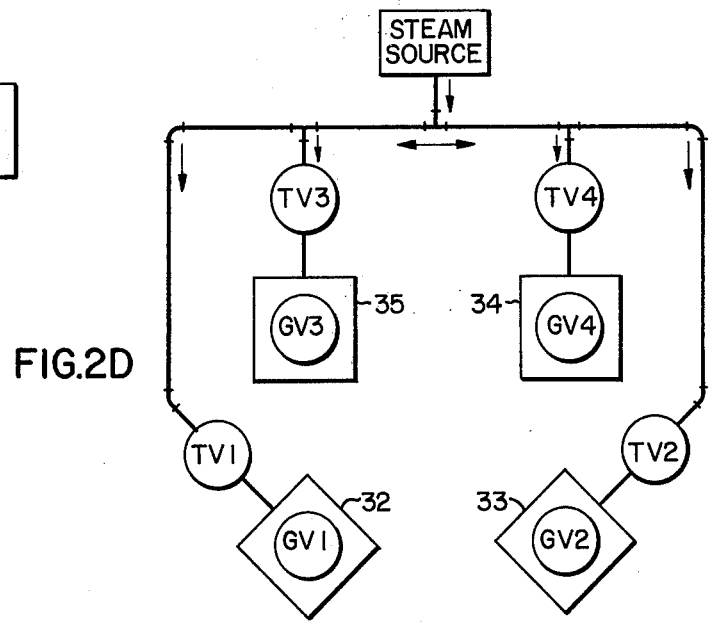

FIGS. 2A through 2D illustrate schematically various arrangements of steam inlet valves where the application of the system of the present invention would be most advantageous. For example, FIG. 2A shows a pair of single-ended steam chests 25 and 26, each of which includes only two governor valves. FIG. 2B illustrates a valve arrangement for the steam leaving the high-pressure turbine and flowing through a reheater 27, and stop valves RSV1 and RSV2 which are upstream from respective intercept valves IV1, IV2, IV3 and IV4 for admitting steam to an intermediate pressure turbine section 28. In this arrangement, the testing of the reheat stop valve RSV1 would involve the closing of the intercept valves IV1 and IV2 with the intercept valves IV3 and IV4 taking up the required steam flow. Alternately, the reheat stop valve RSV2 is tested by closing the intercept valves IV3 and IV4 with the intercept valves IV1 and IV2 taking up the required steam flow. FIG. 2C illustrates a different arrangement of governor valves GV1 through GV4 inclusive in respective single-ended steam chests 30 and 31. FIG. 2D illustrates a plurality of steam chests 32, 33, 34 and 35, each of which has an upstream throttle valve TV1 through TV4 inclusive and a single governor valve GV1 through GV4. Although the invention is particularly applicable to single-ended steam chests, there may be control system installations where other than single-ended steam chests may be used with the invention advantageously, and, of course, other steam inlet valve arrangements.

With respect to the positioning of the valves during normal operation in an application where the throttle valves have a flow control capability, the governor valves are typically all fully opened as a part of the start-up process; and steam flow is then varied by full arc throttle valve control. At some point in the start-up and loading process, transfer is normally and preferably automatically made from full arc throttle valve control to full arc governor valve control because of throttling energy losses and/or reduced throttling control capatility. When operating in a full arc or single valve mode, all the valves GV1 through GV8 are being controlled to a similar position in order to introduce the steam equally through an entire 360° of the turbine nozzles. After sufficient turbine heating has occurred, the operator transfers to partial arc or sequential mode governor valve control to obtain improved heating rates. In the partial arc mode, the governor valves are operated in a predetermined sequence, usually directed to achieving thermal balance on the rotor and relatively reduced rotor blade stressing while producing the desired turbine speed and the load operating level. For example, in a typical governor valve control mode, the governor valves are sequentially placed in operation in a predetermined order to produce steam flow control at required steam flow levels. If the main steam inlet valves should be stop valves, for example, without flow control capability, which is usually the case in nuclear turbines, initial steam flow control during start-up is achieved by means of the single valve or full arc mode of governor valve operation. Transfer is then made to the partial arc or sequential mode at an appropriate load level.

Figure 3:
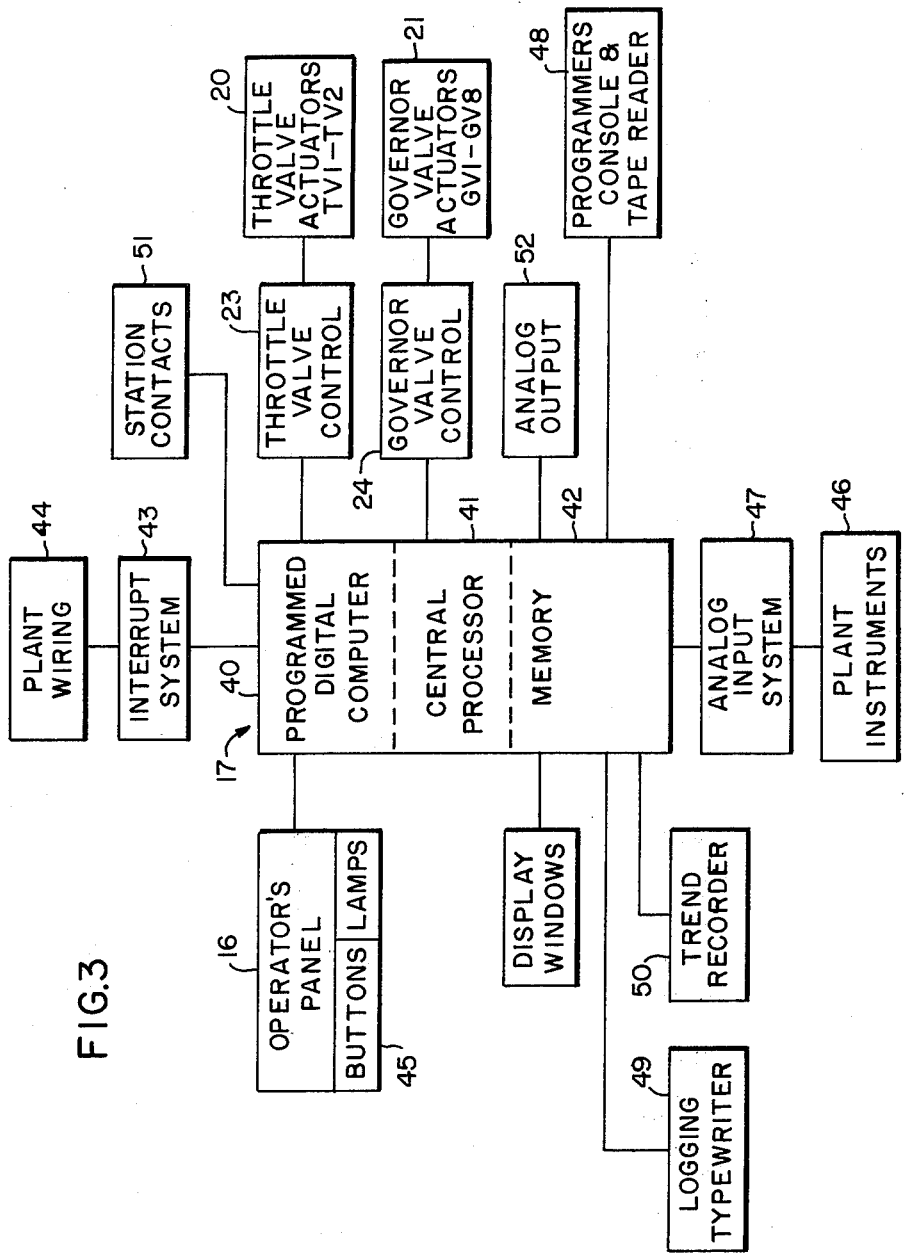
FIG. 3 is a schematic structural block diagram of the overall turbine control system, in its preferred form.

Referring to FIG. 3, the digital electrohydraulic control system 17 with its valve position demand generating system 18 includes a programmed digital computer 40 to operate the turbine 10. The computer 40 typically includes conventional hardware including a central processor 41 and a memory 42. The digital computer 40 and its associated input-output interfacing equipment is a suitable digital computer system and may be that sold by Westinghouse Electric Corporation under the trade name of P2000. The P2000 computer, which is designed for real time process control applications, typically uses a 16 bit word length with 2's complement, a single address and fixed word length operated in a parallel mode. All the basic digital electrohydraulic control system functions are performed with a sixteen thousand word, 3 microsecond magnetic core memory. An integral magnetic core memory can be expanded to sixty-five thousand words (65k). A repertoire of 32 instructions include multiply and loading and unloading of program registers.

The equipment interfacing with the computer 40 includes a contact interrupt system 43 which scans contact and other state variables representing the status of various plant and equipment conditions in plant wiring 44. The status contacts might typically be contacts of mercury wetted relays (not shown) which operate by energization circuits (now shown) capable of sensing the predetermined condition associated with the various system devices. Data from status contacts is used in interlock logic functioning and control for protection analog system functioning, program monitoring and logging, and demand logging, for example.

The operator's panel 16 includes buttons 45 to transmit digital information to the computer 40. The buttons 45 can set a load reference, a megawatt output, speed, the operation of the individual valves TV and GV, and place such valves in the single or sequential mode of operation, as well as performing the function of a throttle valve test as more fully described hereinafter. In addition, plant instrumentation generally referred to at 46 is interfaced with the program digital computer 40 by an analog input system 47. The analog input system 47 samples analog signals at a predetermined rate from predetermined input channels, and converts such sample signals to digital values for entry into the computer 40. The analog signals which are sent in the plant instrumentation 46 represent positions of the throttle valves, TV1 and TV2 and the governor valves GV1 through GV8. Further, the analog signals sensed may represent the impulse chamber pressure, the megawatt power, steam flow, various steam temperatures, and various other conditions which are necessary for the automatic operation of a turbine.

A conventional programmer's console and tape reader 48 is provided in the system 17 for various purposes including program entry into the central processor 41 and the memory 42. A logging typewriter 49 is provided for logging printouts of various monitored parameter signals and warnings provided by an automatic turbine start-up system. A trend recorder 50 continuously records predetermined parameters of the system. The interrupt system 43 controls the input and output to transfer information between the digital computer 40 and the input/output equipment. A digital computer 40 acts on interrupt from the interrupt system 43 in accordance with an executive program. Interrupt messages from the interrupt system 43 stop the digital computer 40 by interrupting a program in operation. The interrupt signals are serviced immediately.

Output interfacing is provided by contacts 51 and the computer 30. The contacts 51 operate lamps on the operator's panel 16; and they operate in conjunction with a conventional analog/output system and a valve position control output system that includes the throttle valve position control 23 and the governor valve position control 24. The controls 23 and 24 position the throttle valves TV1 and TV2, and the governor valves GV1 through GV8 by the hydraulic actuators 20 and 21. The digital output date from the computer 40 is first converted to analog signals in an analog output system 52, which analog signals are utilized by the valve control systems 23 and 24. Such converted analog signals are also applied to auxiliary devices and systems, not shown, and interceptor valve systems for operation of the valves illustrated in FIG. 2B.

Figure 4:
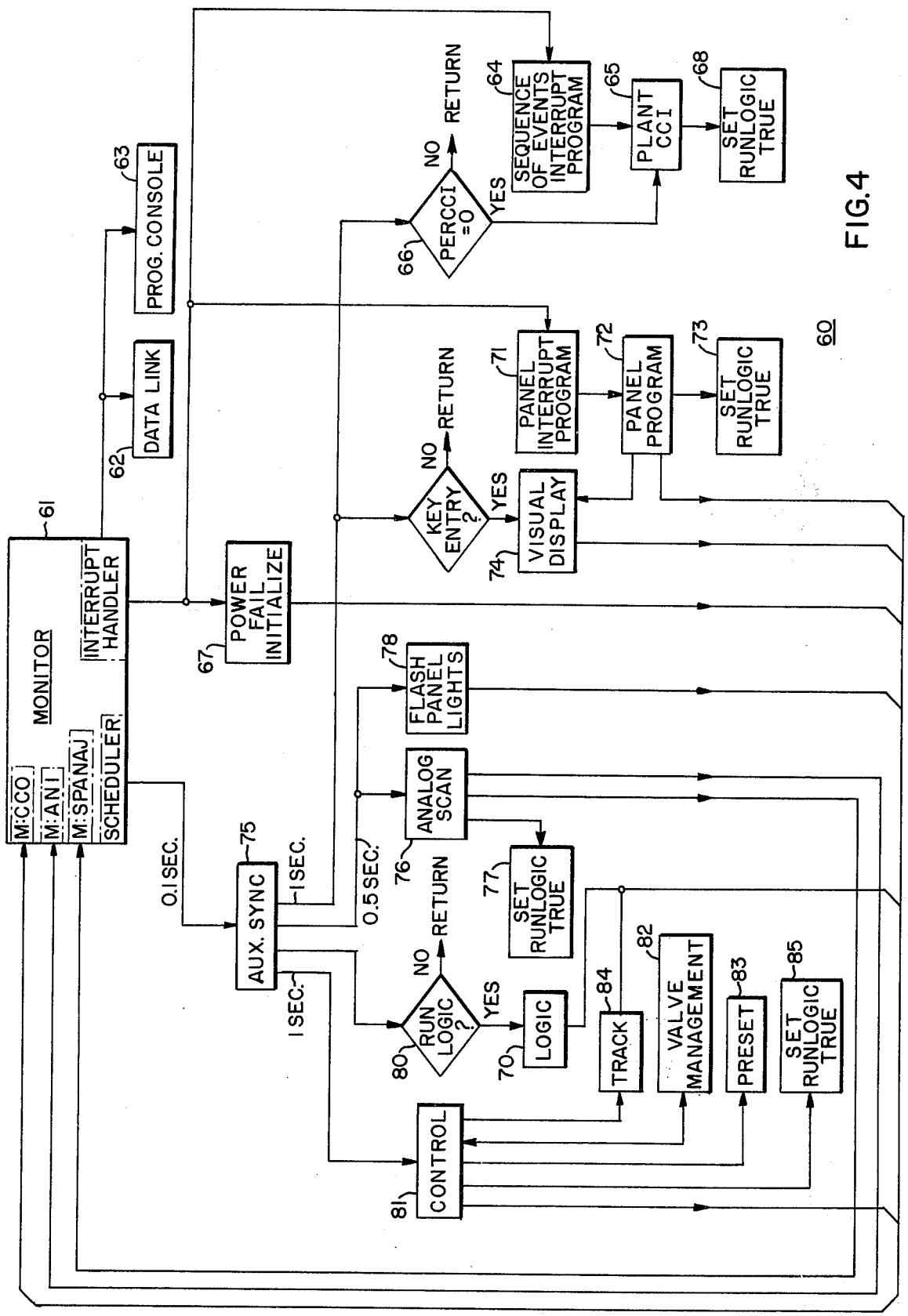
FIG. 4 is a schematic organization for a program system employed in a digital computer which functions as part of the control system.

Referring to FIG. 4, the digital computer 40 of FIG. 3 is preferably structured by a computer program system 60 to operate the control system 15 (FIG. 1) as a sampled data system when providing turbine and plant monitoring and continuous turbine and plant control. The program system 60, which is described in detail in copending application No. 247,877, is described herein only to the extent necessary to develop an understanding of the manner in which the system of the present invention is applied.

A standard executive or monitor program 61 provides scheduling control over the running of programs in the computer 40 as well as control over the flow of computer inputs and outputs through the previously mentioned input/output systems. Generally, each program is assigned to a task level in a priority system, and bids are processed to run the bidding program with the highest priority. Interrupts may bid programs, and all interrupts are processed with the priority higher than any task level. A data link program 62 is bid on interrupt demand to provide for intercomputer data flow. A programmer's console program 63 is also bid on demand by interrupt, and it enables an operator to make parameter and other program system changes.

When a system contact changes state, an interrupt causes a sequence of events interrupt program 64 to place a bid for scan of all system or plant contacts by a program 65. A periodic bid can also be placed for running the contact closure input program 65 through a block 66. A power fail initialize program 67 also can bid the contact closure input program 65 to run as part of the computer initialization procedure during computer starting or restarting. The program 67 also initializes contact outputs through the executive program 61.

In some instances, changes in contact inputs will cause a bid of the program 68 to be placed for a logic task program 70 to be executed so as to achieve programmed responses to certain contact input changes.

When an operator panel signal is generated, external circuitry decodes the panel input and an interrupt is generated to cause a panel interrupt program 71 to place a bid for the execution of a panel program 72 which provides a response to the panel request. The panel program 72 can itself carry out the necessary response, or it can place a bid 73 for the logic task program 70 to perform the response, or it can bid a visual display program 74 to carry out the response. In turn, the visual display program 74 operates contact closure outputs to produce the responsive panel display.

Generally, the visual display program 74 causes numerical data to be displayed in panel windows in accordance with operator request. When the operator requests a new display quantitiy, the visual display program 74 is initially bid by the panel program 72. Apart from a new display request, the visual display program 74 is bid periodically to display the existing list of quantities requested for display.

The pushbuttons and keys on the operator panel 16 (see FIG. 8) may be classified in several functional groups. For example, some pushbuttons are classified as control system switching, since they provide for switching in or out certain control functions. Another group of pushbuttons provides for operating mode selection. Another group of pushbutton is related to valve status/testing/limiting, while still another group provides for visual display and change of digital electrohydraulic system parameters. Still another group of pushbuttons relates to keyboard activity, i.e., of the entry of numerical data into the computer 40.

Periodic programs are scheduled by an auxiliary synchronizer program 75, which in turn, is bid each tenth of a second by the executive program 61. An external clock (now shown) functions as the system timing source. An analog scan program 76 is bid every half second to select analog inputs for updating through an executive analog input handler. After scanning, the analog scan program 76 converts the inputs to engineering units, performs limit checks, and makes certain logical decisions. The logic task 70 may be bid clock 77 as a result of an analog scan program run. A flash panel lights program 78 is also bid every half second to flash predetermined panel lights through the executive contact closure output handler under certain conditions. The logic program 70 is run periodically to perform various logic tasks if it has been bid by decision block 80.

A control program 81 functions to (1) compute throttle and governor valve positions to satisfy speed and/or load demand during operator or remote automatic operation, and (2) tracking valve position during manual operation. Generally, the control program 81 is organized as a series of relatively short sub-programs which are sequentially executed.

In performing turbine speed control, speed data selection from multiple independent sources is utilized for operating reliability, and operator entered program limits are placed on high and low load, valve position, and throttle pressure. Generally, the control program 81 executes operator or automatically initiated transfers bumplessly between manual and automatic modes, and bumplessly between one automatic mode and another automatic mode. In the execution of control and monitor functions, the control program 81 is supplied, as required, with appropriate representations of data derived from input detectors (not shown), and system contacts described in connection with FIG. 3.

The control program 81 logically determines turbine operating mode by a select operating mode function which operates in response to logic states detected by the logic program 70 from panel and contact closure inputs. For each mode, appropriate values for demand and rate of change of demand are defined for use in control program execution of speed and/or load control.

The speed control mode, which is pertinent to the described embodiment of the invention, is known as Operator Automatic, in which the operator generates the speed demand and rate on the control panel 16 (FIG. 1). The load control mode, which is pertinent to the described embodiment of the invention, is the Operator Automatic, in which the operator generates load demand and rate.

The control program 81 includes a speed/load reference function. Once the operating mode is defined, the speed/load reference function generates the reference representation which is used by the applicable control functions in generating valve position demand.

The speed or load references are generated at a controlled or selected rate to meet the defined demand. Generation of the reference at a controlled rate until it reaches the demand is particularly significant in the automatic modes of operation. Generally, the speed/load reference function is responsive to GO and HOLD logic and in the GO condition, the reference is brought up or down at the programmed defined rate until it equals the demand, until a limit condition, or other requirement is met.

A speed control function provides for operating the throttle and governor valves to drive the turbine 10 to the speed corresponding to the reference with substantially optimum dynamic and steady state response. Similarly, a load control function provides for positioning the governor valves so as to satisfy the existing load reference with substantially optimum dynamic and steady state response. A feedback trim signal may be applied to the speed/load control functions to reduce any error of the feedforward control signals to the throttle and governor valves to zero if desired. A frequency and megawatt corrected load reference operates as a flow demand for the valve position demand generating system 18 may conveniently be termed a valve management sub-routine or program referred to at 82 in FIG. 4.

In the event the megawatt error and frequency participation feedback loop is in service, the load reference value is trimmed to reduce the megawatt error to zero. The frequency and megawatt corrected load reference operates as a setpoint for the impulse pressure control to the valve management sub-routine 82 in the event that the impulse pressure control feedback is in service. In such event, the output of the input pressure controller or the output of the speed and megawatt corrected load reference functions as a governor valve setpoint, which is converted into a percent flow demand prior to application to the valve management sub-routine 82.

Control program 81 further includes a throttle valve control function and a governor valve control function. During automatic control, the outputs from the throttle valve control function are position demands for the throttle valves, and during manual control, the throttle valve control outputs are tracked to the like outputs from the manual control. Generally, the position demands hold the throttle valves closed during a turbine trip, provide for throttle valve position control during start-up, and during transfer to governor valve control; and then hold the throttle valves wide open during and after the completion of the throttle/governor valves transfer.

The governor valve control function generally operates in a manner similar to that described for the throttle valve control function during automatic and manual operations of the control system 15. The governor valve control function outputs data applied to it by the valve management sub-routine 82. A preset sub-routine 83 evaluates an algorithm for a proportional-plus-reset controller, as required, during execution of the control program 81. In addition, a track sub-routine 84 is employed when the control system 15 is in the manual mode of operation.

Certain logic operations are performed by the logic program 70 in response to a control program bid by block 85. The logic program 70 includes a series of control and other logic tasks which are related to various parts of the program system 60; and it is executed when a bid occurs on demand from the auxiliary synchronizer program 75 in response to a bid from other programs in the system.

Generally, the purpose of the logic program 70 is to define the operational status of the control system 15 from information obtained from the turbine system, the operator and other programs in the program system 60. Logic tasks included in the program 70 include the following: flip-flop function, maintenence task, speed channel failure monitor lamps, automatic computer to manual transfer logic, operator automatic logic GO and HOLD logic, governor control and throttle control logic, turbines latch and circuit breaker logic, megawatt feedback, impulse pressure, and speed feedback logic, and automatic synchronizer and dispatch logic, all as described in the aforementioned referenced co-pending patent application, Ser. No. 247,877.

During automatic computer control, the valve management sub-routine 82 develops the individual governor valve position demands needed to satisfy steam flow demand and ultimately the speed load reference, and does so in either the sequential or the single valve mode of governor valve operation, or during transfer between these modes. Mode transfer is effected bumplessly with no load change other than any which might be demanded during transfer. Since changes in throttle pressure cause actual steam flow changes at any given turbine inlet valve position, the governor valve position demands may be corrected as a function of throttle pressure variation. In the manual mode, the track sub-routine 84 employs the valve management sub-routine 82 to provide governor valve position demand calculations for bumpless manual automatic transfer.

Figure 5:
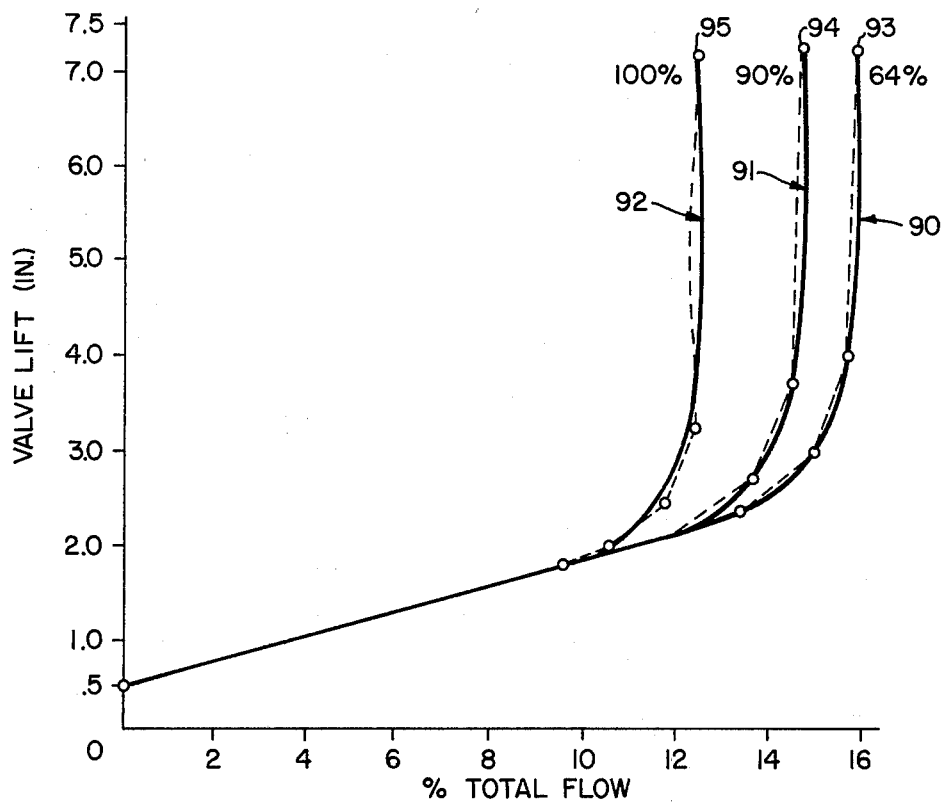
FIG. 5 is a graph showing typical nonlinear curves of valve position versus steam flow, which are used to position the control valves of the system of the present invention.
Figure 6:
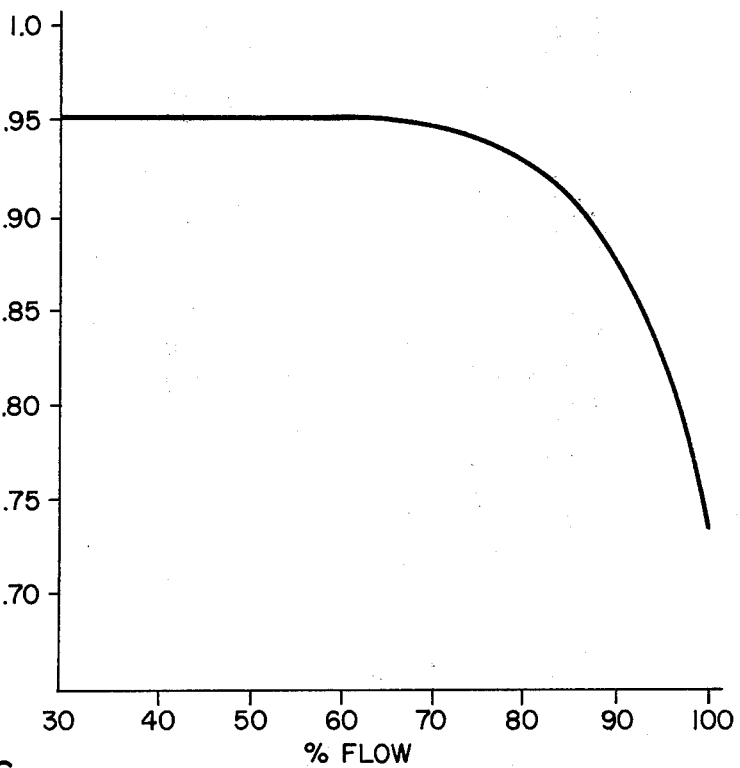
FIG. 6 is a graph of a stage flow coefficient curve used in calculating the curve of FIG. 5.

Referring to FIG. 5, the valve management program 82 of FIG. 4, which is described in detail in the referenced copending application Ser. No. 478,815, calculates governor valve position from a non-linear characterization in the form of a curve of valve position (or lift) versus steam flow. A curve such as the curve 90 of FIG. 5, which is valid for low operation, such as up to sixty-four percent of the total turbine steam flow, for example, is stored for use in the valve management program 82. A curve employed for control calculations is obtained by correcting the stored curve 90 for changes in load or flow demand, and preferably for changes in actual throttle pressure. For example, in FIG. 5, a curve 91 is calculated by the valve management sub-routine 82 for a total turbine steam flow or load of approximately 90%; and a curve 92 is calculated by the valve management sub-routine 82 for a total turbine steam flow of 100%. A stored curve of flow coefficient versus steam flow demand, such as shown in FIG. 6, is used to determine the applicable flow coefficient to be used in correcting the stored low load position demand curve 90 for load or flow changes. Preferably, the valve position demand curve is also corrected for the number of nozzles downstream from each governor valve.

In the single valve mode, the calculated total governor valve position demand is divided by the total number of governor valves to generate the position demand per valve which is output as a single valve analog voltage applied commonly to all the governor valves, GV1 through GV8, (FIG. 1). In the sequential mode, the governor valve sequence is use in determining, from the corrected position demand curve, which governor valve or group of governor valves is to be fully opened; and which governor valve or group of governor valves is to be placed under position control to meet load reference changes. Position demands are determined for the individual governor valves, and individual sequential valve analog voltages are generated to correspond to the calculated valve position demand as illustrated by the representative curves of FIG. 5. The single valve voltage is held at zero during sequential valve operation; and the sequential valve voltage is held at zero during single valve operation.

To transfer from single to sequential valve operation, the net position demand signal applied to each governor valve control is held constant as the single valve analog voltage is set to zero, and the sequential valve analog voltage is stepped to the single valve voltage value. Sequential valve position demand is then computed, and the steam flow changes required to reach target steam flows through individual governor valves are determined. Steam flow changes are then implemented iteratively, with a number of iterations determined by dividing the maximum flow change for any one governor valve by a predetermined maximum flow change for iteration. Total steam flow remains substantially constant during transfer since the sum of incremental steam flow changes is zero for any one iteration.

To transfer from sequential to single valve operation, the single valve position demand is determined from steam flow demand. Flow changes required to satisfy the target steam flow are determined for each governor valve, and an iteration procedure like that described for single to sequential transfer is employed in incrementing the valve positions to achieve the single valve target position substantially without disturbing total steam flow. If steam flow demand changes during any transfer, the transfer is suspended. The steam flow change is satisfied equally, and all valves move in the direction required to meet the change.

The valve management program 82, as described in detail in the referenced copending patent application Ser. No. 478,815, may include a valve curve selection, or a computation of valve curve depending upon the particular embodiment of the valve management utilized. It also includes provision for computation of new valve flows for transfer from single to sequential valve mode, computation of new valve flows for transfer from sequential to single valve mode operation, computation of new valve flows for flow demand change during a valve mode transfer, a computation of the number of iterations required to complete a valve mode change, computation of valve positions, and computation of actual flows through valves after a manual mode change.

Total steam flow demand is calculated in the control program 81 as previously described in connection with FIG. 4. Data representing the flow coefficient, as shown in FIG. 6, is stored in the memory of the computer 40; and the percentage of the total flow of each valve is shown on the abscissa of FIG. 5, while the valve lift in inches for the percentages of total according to the curves 90, 91 and 92 is shown on the ordinate of the curve of FIG. 5. The stage flow coefficient curve of FIG. 6 is the ratio of actual flow at a flow demand over the theoretical flow if the orifice coefficient were equal to one. As the valve flow increases, a range of critical flow is passed through. This critical flow for one typical installation is approximately 64% of the total flow, or approximately 16% of the total flow for each of the valves. Once the particular total flow demand is calculated by the control program 81, a stage coefficient is calculated to calculate control valves positions. If the flow demand is greater than the curve 90, for example, a new curve, for example curve 91, is calculated because the curve for critical flow can only be used for flows up to 64% in the descirbed example. In order to calculate a curve with a corrected stage flow coefficient less than 1, the abscisss of the curve are multiplied by the corrected stage flow coefficient. Similarly, the ordinants of the curve are corrected, and then multiplied by the corrected stage flow coefficient from FIG. 6. Therefore, as the corrected stage coefficient varies due to changes in flow demand, a new dynamic curve is generated. The accuracy of representation or precision of operation is only limited by the resolution of the computer 40, and the data representing the characteristics of the particular valves. In practice, five data points for each curve as indicated in FIG. 5 have been sufficient to give an accuracy of better than 2% between flow demand and actual flow.

During sequential valve or partial arc operation, one valve is usually partially opened and the other valves are usually either fully opened or fully closed. Since the stage flow coefficient as represented by the curve of FIG. 6 is dependent upon total flow demand, the number of valves and their positions contributing to the flow do not effect the calculation as performed on the appropriate curve of FIG. 5. The stage flow coefficient is the same if all the control valves are partially opened, if some of the control valves are fully opened, or if some are closed and one control valve partially opened. The fully opened control valves contribute the percent of total flow as shown by the end point 93, 94 or 95. The partially opened control valve makes up the remainder of the total flow demand in accordance with a function whereby the percent of total flow demand through the partially open valve ended in the abscissa of FIG. 5, and the actuator lift is shown on the ordinate.

Thus, the valve management program 82 dynamically calculates data which represents control valve demand or flow as a function of the valve lift of a control valve, while compensating for the pressure variation and the corrected first stage flow coefficient. The calculation of a dynamic flow demand versus lift characteristics for each of the valves is dependent upon the total flow of fluid through the turbine. A stage flow coefficient is constant regardless of the mode correct operation of the turbine whether it be single valve or sequential valve. In addition, as described in detail in the copending patent application Ser. No. 306,942 referenced herein, the valve demand versus lift characteristic data is modified dynamically for variations in the throttle pressure, and also for the variation of the number of nozzles under each valve. Although the valve-lift versus steam flow curve for the turbine valve system described may only utilize the basic curve for valve testing because it is valid for up to sixty-four percent total flow, other installations may require calculation for different flows within the test range.

Figure 7:
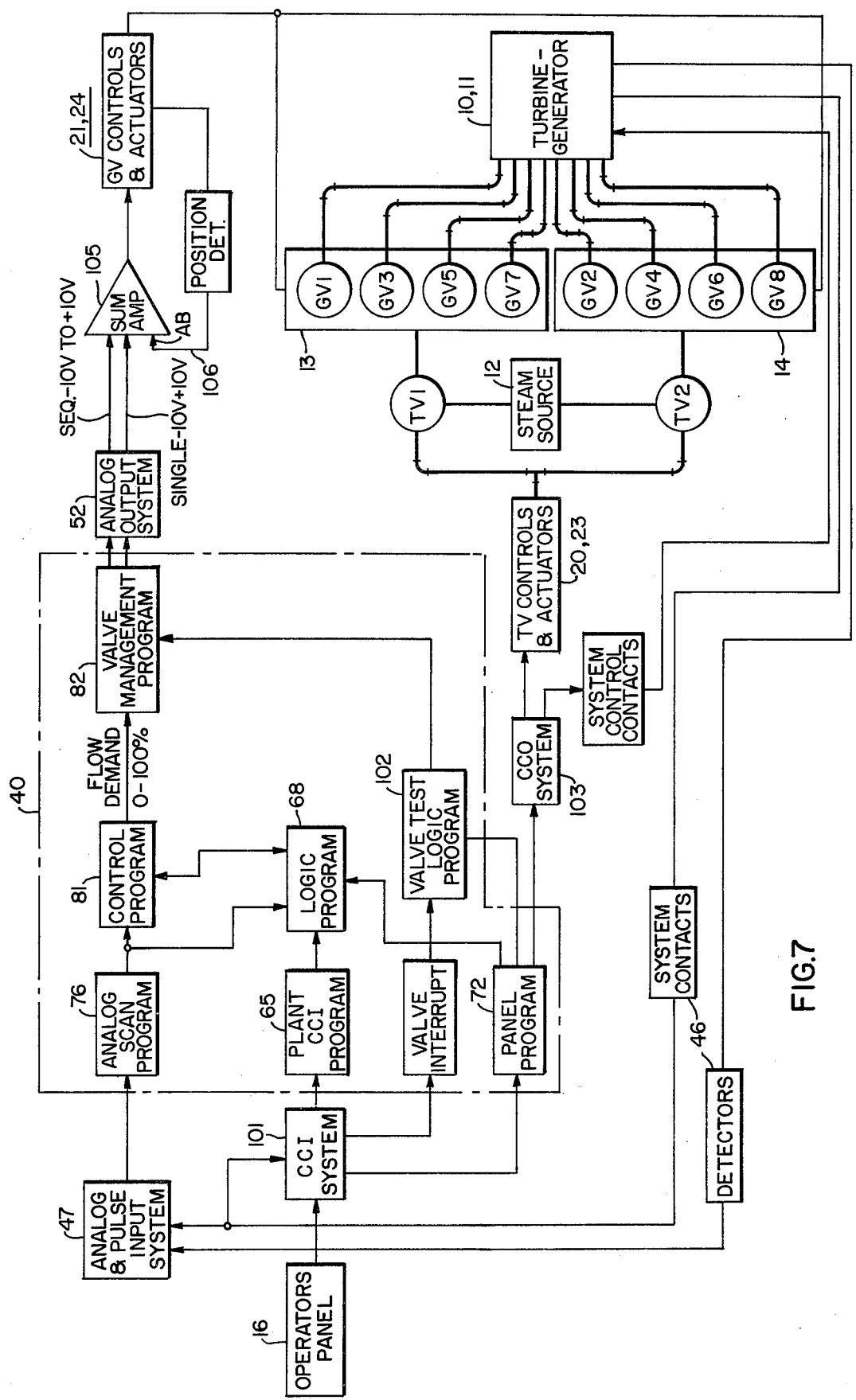
FIG. 7 is a schematic diagram of a turbine system showing in greater detail the system organization of the present invention.

Referring to FIG. 7, a valve testing system is illustrated schematically in accordance with the principles of the invention to provide a capability for testing steam inlet valves which are upstream of the control or governor valves without the necessity of feedback response, and during either a single or sequential mode of operation. The test system, in its preferred form, includes previously considered elements of the control system 15 (FIG. 1) as schematically illustrated in FIGS. 3 and 4. In the description of the valve test system, like reference characters are employed where functional blocks or structural elements previously considered herein are employed. The present description is directed to a disclosure which is aimed at providing a full understanding of the invention, and more complete details on the structure and operation of various control system elements as related to the embodiment of the present invention are included in the referenced applications.

Prior to and during functioning of the valve test system, the analog output system 52 responds to input data from the valve management sub-routine 82 to operate the governor valve GV1 through GV8 in the steam chest 13 and 14. The control program 81 in the computer 40 generates a representation of total turbine steam flow demand, which is a feedforward signal that corresponds to a percentage of total steam flow; that is, a steam flow demand ranging from 0 to 100%. The total steam flow demand representation is input to the valve management sub-routine 82, which has the capability of changing the operational mode of the governor valves to a single or sequential mode of operation without substantially disturbing the total inlet stream flow to the turbine. The analog output system 52 generates both single valve and sequential valve position demand signals. In the single valve non-test mode, the sequential position demand signals zero; and in the sequential valve non-test mode, the single valve position demand signal is zero.

In order to initiat a throttle valve test, a signal is generated at the operator's panel 16 to identify a particular throttle valve to be tested. Panel operations are applied to the computer 40 through a contact closure input system 101 when panel interrupts cause the panel program 72 to respond to panel request. In the functioning of the panel program 72, a panel request can be carried out within such program, or the panel program can bid the valve test logic routine 102 as well as the logic program 68 to carry out the final request. Once a throttle valve test is called by the panel program 72, valve test logic routine 102 functions as part of the valve management subroutine 82 to call for the repositioning of the governor valve in the test steam flow path which described in detail in connection with the description of FIGS. 9, 10A and 10B.

The panel program 72 automatically generates a closure signal for the test throttle valve through a contact closure output system 103 once the test path governor valves are closed. The external analog circuitry responds to the CCO system 103 by applying a close bias signal to the applicable throttle valve electrohydraulic control 20, 23.

Figure 9:
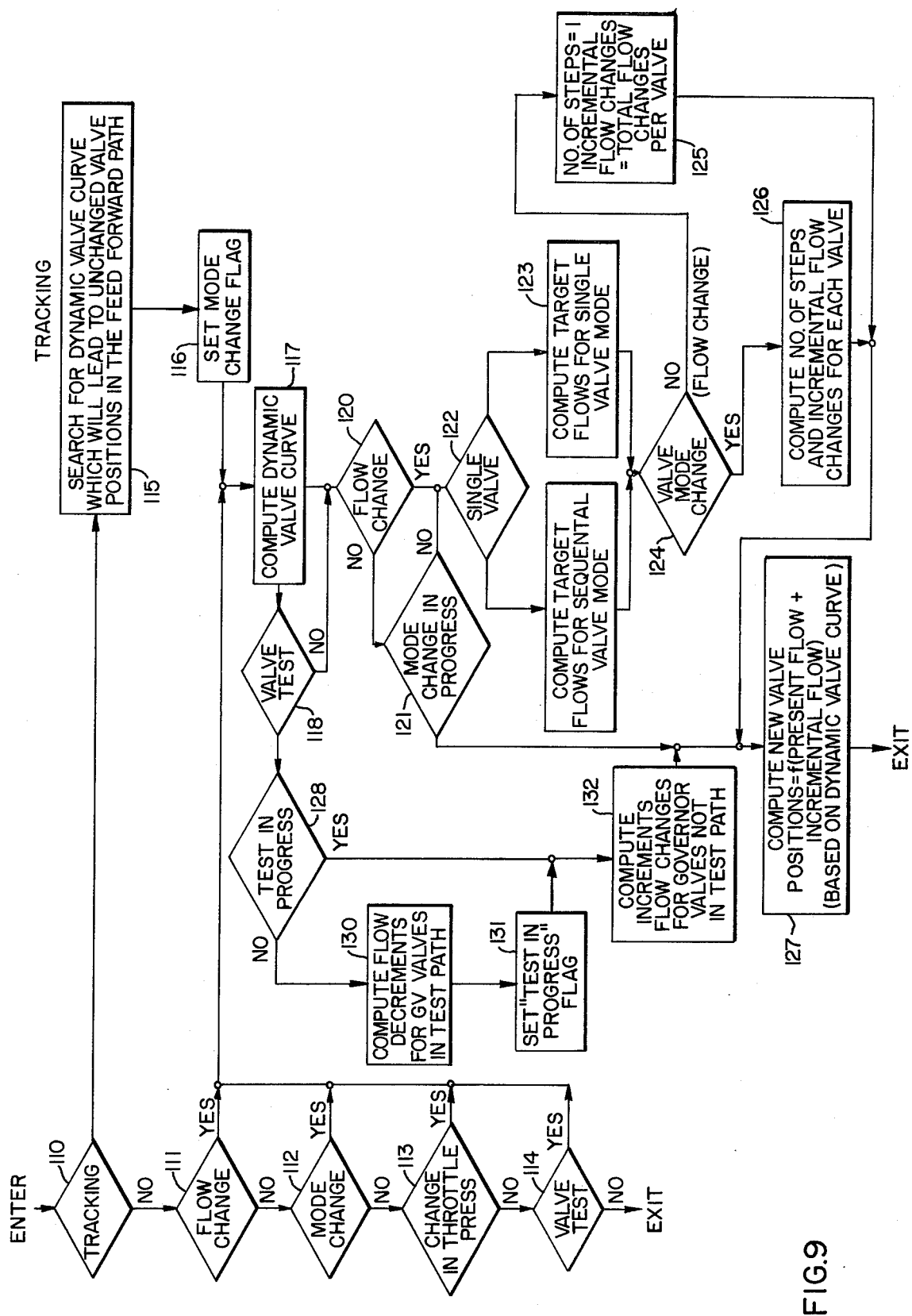
FIG. 9 is a flow chart of the valve management program system employing the valve test system according to one embodiment of the invention.

Referring to FIG. 9, when a throttle valve test is to be made, the opertor presses the pushbutton VALVE TEST on the control panel. Next, the throttle valve pushbutton TV is pressed along with a valid throttle valve number TV1 or TV2. The ENTER pushbutton is next pressed, and finally the CLOSE pushbutton is pressed to initiate the test for the selected throttle valve. As described in connection with FIGS. 9, 10A and 10B hereinafter, in the event that the governor valves are in their single valve position, the appropriate control valves in the steam path are closed; and the remaining valves in the non-test path are opened to take up the additional load caused by the closure of the test path governor valves by applying incremental or decremental signals to the sequential output from the analog output system 52. The decremental and incremental signals on the sequential output are summed with the single mode signals by a summing amplifier 105 in the control mechanism for the governor valves 21, 24. In the event that the test is conducted while the turbine is operating in the sequential mode, the incremental and decremental signals occur on the respective sequential input to the summing amplifier 105. In the sequential mode, the single mode output from the output system 52 to the input of the summing amplifier 105 remains zero even during the test.

Figure 8:
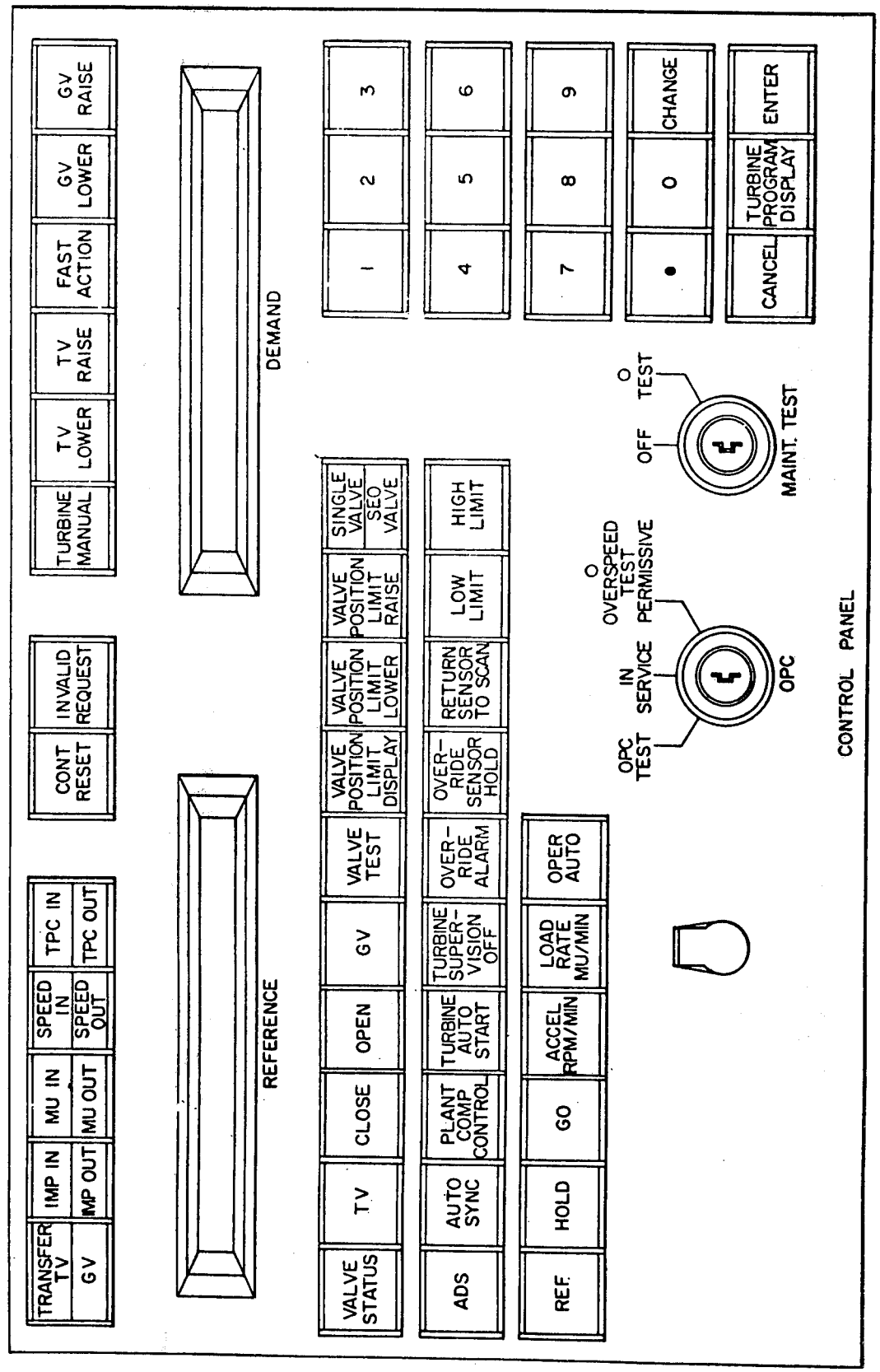
FIG. 8 is a front view of a typical operator's panel employed in the valve test system.

Once the downstream governor valves in the test steam path are closed, and the governor valves in the non-test steam path are repositioned, the throttle valve CLOSE signal is automatically generated and the resultant throttle valve action is verified by the panel indicator (not shown in FIG. 8). Upon release of the CLOSE pushbutton, the computer 40 removes the throttle close bias signal and causes the throttle valve to reopen. When the operator presses the OPEN pushbutton, the valves GV1 through GV8 are repositioned to either the single or sequential mode of operation, which was in existence prior to the initiation of the valve test.

In FIGS. 9, 10A, 10B and 11, there is shown flow charts which schematically illustrate the programming function of computer 40 in the operation of the valve test system. In FIG. 9, chart is shown for the program steps employed in the valve management system including the valve test capability. The valve management program is called once each second by the computer 40, for example. If the system is not tracking, as shown by decision block 110, or if there is no flow change input from the control program 81 as indicated by decision block 111, or there is no mode change as indicated by the decision block 112, or if there is no change in throttle pressure of the system as indicated by decision block 113, and finally, if there is no valve test initiated by the operator, the valve management program exits. However, in the event that the system is tracking, such as would occur prior to changing from a manual to an automatic mode, the program searches for the dynamic valve curve as indicated by block 115 which will lead to unchanged valve positions in the feedforward path. The dynamic valve curve is described previously in connection with FIG. 5. Upon completion of the dynamic valve curve search, the mode change flag is set as indicted by block 116. Next, the program computes the dynamic valve curve as indicated by block 117; and if there is no valve test indicated by the decision block 118, no flow change as indicated by block 120, no mode change in progress indicated by decision block 121, and the system is in the single valve mode as indicated by decision block 122, then the target flows are computed for the single valve mode as indicated by function block 123. If there is no valve mode change as indicated by decision block 124, the incremental flow change for each valve is computed as shown by function block 125. Then, as shown by the function block 126, the new valve position is computed as a function of the actual flow plus the incremental flow in accordance with the dynamic valve curve described in connection with FIG. 5.

If the operator enters a mode change, as indicated by the decision block 112, and there is no valve test initiated, the first iteration of the program computes the number of steps and incremental flow changes for each valve from the decision block 124 as indicated by function block 126. Then, the new valve position is computed in accordance with the dynamic valve curve as indicated by the function block 126. In response to a change in throttle pressure as indicated by the decision block 113, the same steps occur as described in connection with a flow change.

For a valve test, which is entered by the operator as previously described, during the first periodic operation of the computer 40, the dynamic valve curve as shown in FIG. 5 is computed as noted by the function block 117. Inasmuch as the remaining governor valves which are open must compensate or take up the extra total steam flow because of the closing of four of the governor valves, the valve curve which is utilized corresponds to the valve curve 90 of FIG. 5 for the present system which is valid for loads up to 64 percent of the total turbine steam flow, for example. Thus, the load would necessarily be cut back to at least 50% of the total output in order that the proper steam flow is directed to the turbine during a valve test. Thus, for a 48% total steam flow or lower, the valve curve 90 is still valid. For the first run of the program, the valve test is noted by the decision block 118, and there is no "test in progress" as indicated by decision block 128.

The flow decrements for each of the governor valves in the test path which are to be closed as previously described, prior to the closing of the throttle valve under test, are computed in accordance with a function block 130. Then, appropriate flags are set indicating that a valve test is in progress by block 131, and the incremental flow changes for the governor valves not in the test path, and which must be repositioned in order to accept the additional flow, which is created by the closure of the governor valves in the test path, is computed in block 132. Then, the block 127 computes new valve positions in accordance with the present flow and the calculated incremental flow based on the dynamic valve curve 90 (FIG. 5). During the next operation of the program, the "test in progress" flag is set and the program computes the increments of flow change for the governor valves not in the test path as indicated by the decision block 128.

In summary, and as will be described in connection with the description of the flow charts of FIGS. 10A and 10B, the valve test system operates by calculating the flow decrement for each of the governor valves to be closed (in the test path) by dividing the actual flow through the valves by the total number of steps to valve closure. It is noted that the total number of steps to valve closure is a parameter initialized for each application.

During each subsequent iteration, the system operates by computing the new actual flow for the valves to be closed by subtracting from the old actual flows, the corresponding flow decrement, which was calculated as previously described. The sum of the new actual flows through each of the valves to be closed is calculated, as well as the sum of the old actual flow through the valves not in the test path, that is, those governor valves which are being repositioned to maintain proper total steam flow. The flow increment for the valves not in the test path is calculated by subtracting the old actual flows through the valves not in the test path from the remainder of the sum of the new actual flows through the valves in the test path from the flow demand, which is divided by the number of valves not in the test path. In the described embodiment, the number of valves is four. The actual flow for the valves in the test path is computed by adding the sum of the old actual flows through such valves and the change in such flow is calculated during the instant iteration.

The system operates to check if the new actual flow on any one of the valves not in the test path exceeds the maximum flow for such valve. If such is the case, the new actual flow for the effective valve is limited to the maximum flow; and the excess flow is redistributed through the remaining valves. This check is then repeated for the remaining valves until all the excess flow is distributed through the valves which are fully opened.

After the corresponding throttle valve has been tested, the valves in the test path as well as those not in the test path are restored to their proper pretest positions through the normal "mode change" path similar to that which occurs after a tracking operation, as more fully described in the copending patent application, Ser. No. 478,815, referred to previously.

Figure 10A:
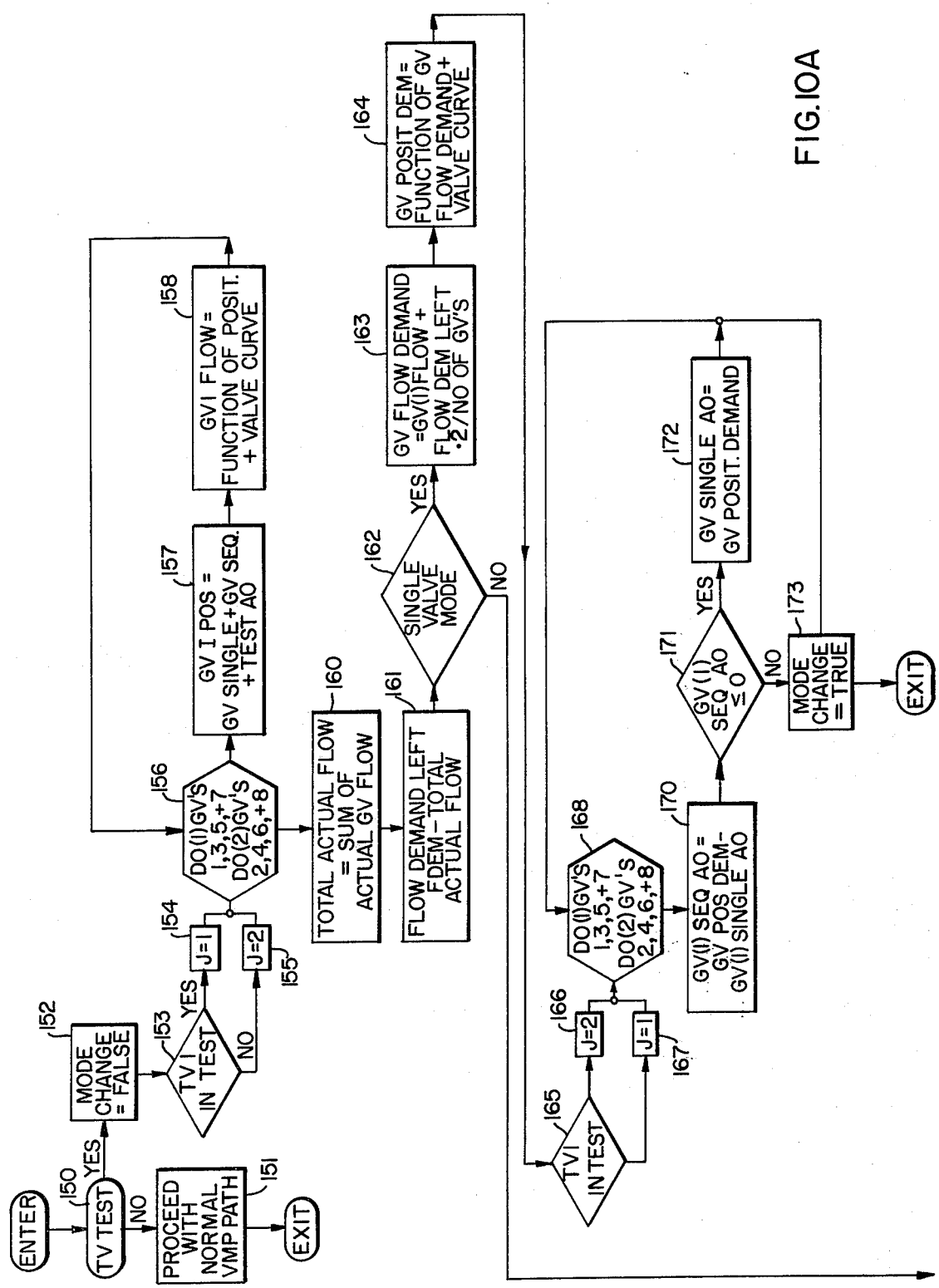
FIGS. 10A and 10B are detailed flow charts of the valve test program system of the present invention
Figure 10B:
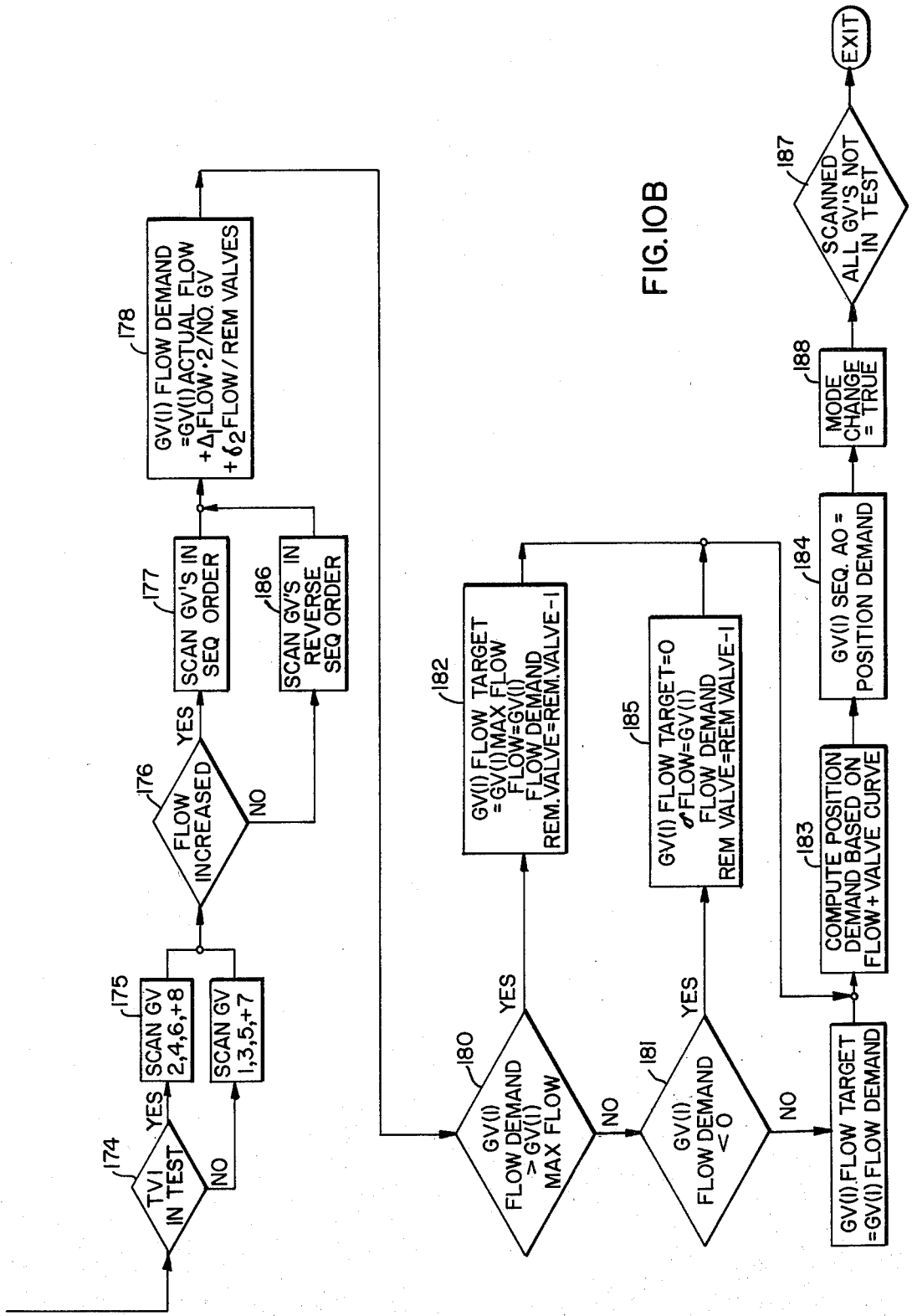

Referring to the flow charts of FIGS. 10A and 10B, the valve test programmed functioning of the valve management 82 of the computer 40 is illustrated. The valve management program 82 includes other functions and operations which are briefly described in connection with the description of the present invention for the sake of simplicity. The valve management program is called periodically by the computer 40 such as once each second, for example. During each second that the program is run, the valve test system operates as described in connection with the various function and decision blocks shown in FIGS. 10A and 10B. Also, once each second, the valve management subroutine 82 provides an output to the analog output system 52 (see FIG. 7) for changing the valve position demand signal for each of the governor valves as controlled by the valve management program 82. In the present embodiment of the invention, the single valve input to the summing amplifier 105 (FIG. 7) is common to all of the eight governor valves GV1 through GV8. It is recalled that in single valve operation, all the governor valves are operated as a single valve. A sequential input to the summing amplifier 105 is different for each of the governor valves or groups of governor valves which are operated in sequence. When a zero potential is present on both the single and sequential inputs to the summing amplifier 105, the valves are in a closed position. A positive potential of 10 volts applied to either the single or sequential input to the summing amplifier 105 controls the governor valve to its fully opened position. When the turbine system is operating in the single valve mode, a zero potential is on the sequential input; and when it is operated in the sequential mode, a zero signal on the single input. During a valve test, when the system is in the single valve operating mode, the position of each of the valves is changed as provided by the system of the invention by applying to the sequential input either a negative signal or a positive signal, depending on the desired direction of operation of the valve. During the sequential mode of operation, the position of the valves is changed by increasing or decreasing the potential on the sequential input.

Each time the control program 81 (FIG. 7) is run, a total steam flow demand is generated which is input to the valve management program 82. If the block 150 of FIG. 10A shows no throttle valve test, the valve management sub-routine 82 calculates valve position demands for the single valve or sequential valve modes as indicated by block 151. If a throttle valve test is initiated, and there is no operating mode change in effect as indicated by the block 152, a block 153 indicates which particular throttle valve is being tested. Assuming in the present example, that the throttle valve TV1 is being tested, a DO loop which is indicated by block 154 is bid, that provides calculations for all of the governor valves GV1, 3, 5 and 7, which are downstream of the throttle valve TV1 under test. During the one-second interval, the DO loop provides calculations for each one of the downstream governor valves in the test path in sequence. Thus, the DO loop is run four times to provide calculations necessary for the four downstream governor valves GV1, 3, 5 and 7. As indicated by block 157, the position of each one of the governor valves is calculated by adding a value representative of the single valve analog output and a value representative of the sequential valve analog output and the value representative of an incremental test only output which is initialized. As indicated by block 158, the flow for each one of the governor valves is calculated as a function of the position which was calculated in block 157 and the valve curve which was described in connection with FIG. 5. After the actual flow has been calculated for all of the governor valves GV1, 3, 5 and 7 by the DO loop as previously described, the total actual flow is calculated as indicated by block 160 by merely adding all of the actual governor valve flows for governor valves GV1 through GV8. As indicated by block 161, the flow demand which is remaining, or the flow error, is calculated by subtracting the total actual flow determined in the block 160 from the total flow demand to the turbine. At this point in the program, a decision block 162 determines whether or not the system is operating in the sequential or the single valve mode. Assuming that in the present example, the turbine is operating in the single valve mode, then the governor valve flow demand for each one of the valves 2, 4, 6 or 8 which are not in the test path is calculated by adding the governor valve flow which was calculated in the block 158 to the remaining flow demand which was calculated in the block 161, and dividing it by the number of governor valves not in the test path which, in the present example, is four. A governor valve position demand representation is then calculated as indicated by block 164 which is a function of the governor valve flow demand, and the valve curve as described in connection with FIG. 5.

Up to this point in the program, we have a governor valve position demand which is based upon a nonlinear governor valve flow demand for each of the valves GV not in the test path. The system is them checked by block 165 to determine which throttle valve is in test. In the present example, TV1 is in test and a DO loop which is indicated by block 166 calculates in sequence during the one second interval that the program is called, a sequential analog output for each of the valves in the test path for algebraic summing with the single valve analog output as previously described. This governor valve sequential output is calculated as indicated by block 170 by subtracting a value representative of the single mode analog output for the governor valve from the governor valve position demand which was calculated by the block 164.

Thus, in summary, in response to the initiation of a valve test while the system is operating in a single valve mode, the operator depresses the appropriate pushbutton on the panel of FIG. 8 which provides a predetermined decrement, or test AO once each second (each time the program is run) which decrement is summed with the digital representation of the single mode analog output and the sequential mode analog output. Then the governor valve flow for each of the valves in the test path is calculated as a function of the curve as described in FIG. 5. These values are then summed to provide a digital value of the total actual flow through the GV's in the test path. Then, a flow demand error is calculated which is utilitzed to obtain a governor valve flow demand representation for each of the governor valves not in the test path. From the governor valve flow demand representation a position demand representation is generted, which is a function of the valve lift position versus flow curve. Thus, governor valves not in the test path are opened to take up the flow increment caused by the calculated flow decrement of the governor valves in the test path. The sequential analog output for each of the governor valves GV1 through GV8 is obtained by subtracting the value of the single mode analog output for each of the governor valves from the governor valve position demand. The sequential analog outputs are changed once each second, or each time the program is run, for repositioning the eight governor valves GV1 through GV8 in accordance with the calculations.

After the throttle valve has been closed, and then reopened, to test its operability, the operator pushes the appropriate panel pushbutton which removes incrementally the initialized value or test AO, as indicated in the block 157. The calculations are the same as previously described, except that the valves in the test path now move toward their open position while the valves not in the test path operate toward a closed position to compensate for the flow now occurring through the test path governor valves. Each governor valve sequential analog output is checked by a block 171 to determine if it is equal to or less than zero. In the event that each of the sequential outputs to the governor valves is equal to or less than zero, the governor valve single analog output is made equal to the governor valve position demand. However, in the event that the sequential analog output is greater than zero for the valves not in the test path, than the valve management program executes a mode change as indicated by block 173 to position the valves in their propr single mode position as described in detail in the copending referenced application Ser. No. 478,815.

In the event that the system is in the sequential mode of operation, and a valve test is initiated, the calculations for the governor valves GV1, 3, 5 and 7 in the test path are performed in the same manner as described in connection with the signal valve operation. However, instead of calculating the governor valve position for all of the remaining governor valves not in the test path during each run of the program, the governor valves are positioned sequentially to take up the increased flow in the same order that they would normally take up the increased flow during normal operation. Therefore, after calculating the flow demand which is left after calculating the flow demand for the governor valves in the test path, the block 162 checks to determine the operating mode of the system. If it is not in the signal valve mode, the system then checks to determine the particular throttle valve which is being tested as indicated by block 174. If the throttle valve TV1 is being tested, the even numbered governor valves, which are the governor valves not in the test path as indicated by the block 175, are scanned. In the event there is a flow increase as indicated by the block 176, which indicates that the scanned governor valves must be opened to compensate for the increased flow during the first part of the test prior to the operation of the throttle valve, the governor valves GV2, 4, 6 and 8 are scanned in sequential order as indicated by block 177. In this event, the valve which is first to take up any increased flow is operated during each one second interval that the program is run until it is fully opened. The flow demand for such governor valve not in the test path is calculated as indicated by block 178 by adding the actual governor valve flow to the change in flow, as determined by the block 161, divided by the number of governor valves for which the flow demand is calculated. Another flow change is summed to obtain the governor valve flow demand which corresponds to the governor valve flow demand less the governor valve maximum flow. If the valve being scanned could not satisfy the flow required, there is another flow change which is that portion of the large total flow change which could not be accommodated. This small flow change is divided by the number of remaining valves to be positioned for accommodating flow change. It follows that if two of the valves are already fully opened, then the remaining number of valves to accommodate such small flow change is equal to two. The flow demand is then compared with the maximum governor valve flow.

If the flow demand for a particular governor valve not under test is greater than the maximum flow for such governor valve, then the target flow is calculated to be equal to the maximum flow. The small delta flow is calculated to be equal to the governor valve flow demand minus the governor valve maximum flow, and the remaining valve is calculated as the remaining valve minus one for allocation of the small delta flow to the next valve during the next iteration. Then, the position demand for such valve is computed, based upon the the flow calculated in the block 178 and the flow curve. The governor valve sequential analog output is then made equal to the calculated governor valve position demand as indicated by block 184 which was computed in the block 183. The single analog output is ignored during sequential mode operation because, as previously mentioned, the sequential analog output is incremented and decremented in accordance with the repositioning of the valves for the test.

In the event that the governor valve flow demand is not greater than the governor valve maximum flow, and the governor valve flow demand is less than zero as indicated by block 181, then the governor valve target flow is calculated as shown by block 185 to be equal to zero. The small delta flow is calculated to be equal to the governor valve flow demand; and the remaining values are calculated for the next iteration to be the remaining valves minus one. In the event that the governor valve flow demand is not less than zero, as indicated by the block 181, then the target flow for such governor valve is equal to the governor valve flow demand. All of the valves are scanned in sequence as indicated by the block 177 until the excess flow caused by the closed position of the valves in the test path is taken up by the valves not in the test path. After the throttle valve has been closed and then reopened, the governor valves are scanned in the reverse sequential order as indicated by block 186. The valves not under test are then closed incrementally in accordance with the previously described calculations. After the valves are repositioned, and all of the governor valves have been scanned, the program exits as indicated by block 187. In the event that the valves are not in true sequential order as indicated by block 188, the system carries out a mode change as described in detail in the referenced copending application.

In summary, for initiating a test while the system is in the sequential mode, the flow demand is calculated for each of the governor valves, and such governor valve is positioned in accordance therewith until the governor valve is fully opened. Then, the next valve in the sequential order is opened in the same manner unitl the entire flow demand is satisfied. For repositioning the valves, the same calculation occurs for the reverse sequential order of the governor valves.

In the appendix, there is disclosed a listing of program computer steps which form a part of a complete program system for the computer 40, and which represent the program steps most directly related to an embodiment of a turbine valve test system arranged in accordance with the principles of the invention. Generally, the listing embodies program functions like those described herein with respect to operation of the valve test system.

The foregoing description has been presented only to illustrate the principles of the invention. Accordingly, it is desired that the invention not be limited by the embodiment described, but, rather, that it be accorded an interpretation consistent with the scope and spirit of its principles, and the appended claims.

APPENDIX

```
1 C         INSERTS TO VALVE MANAGEMENT FOR TV TEST
2 3000      MODCH=.TRUE.
3 C         CHECK FOR WHICH TV IS IN TEST
4           IF(TV1TST) GO TO 3001
```

APPENDIX-continued

```
  5 C         FOR TV2 IN TEST EVEN NUMBERED GV ARE CLOSED
  6           J=3
  7           GO TO 3002
  8 3001      J=2
  9 3002      ITFLAG=.TRUE.
 10           TEST=TESTAO
 11           FIOTAC=0,
 12 C         COMMON AO
 13           GVPZC = 2*(IGVAO(1)-1024)
 14           N=NOGV+1
 15 3008      DO 3003 I=J,N,2
 16 C         COMPUTE VALVE A/O'S
 17           GVPZI=(GVPZC+IGVAO(I)+TEST)/CONV
 18           IF(GVPZI.LT.0) GVPZT=0
 19 C         COMPUTE FLOW THROUGH VALVE I
 20           DO 3004 L=1,NOPPCV
 21           PZC=PZ(L)
 22           IFGVPZT.LT.PZC) GO TO 3005
 23 3004      CONTINUE
 24           FLOW=FL(NOPPCV)
 25           GO TO 3006
 26 3005      K=L+FPTCSL-1
 27           FLOW=FL(K)-FL(K)-1)
 28           FLOW=FLOW/(PZ(J)-PZ(J-1))
 29           FLOW=FLOW+(GVPZT-PZ(J-1))
 30           FLOW=FLOW+FL(K-1)
 31 3006      FLOW=FLOW+PCORF
 32           FACT(I)=FLOW
 33           FTOTAC=FTOTAC+FLOW
 34 3003      CONTINUE
 35 C         CHECK IF THE FLOWS COMPUTED WHERE FOR CLOSING VALUES
 36           IF,NOI(ITFLAG) GO TO 3020
 37 C         PROCEED WITH VALVES NOT UNDER TEST
 38           ITFLAG=.FALSE.
 39           TEST=0
 40 C         FTGTD IS FLOW THROUGH VALVE BEING CLOSED
 41           FTGTD=FLOW
 42           IF (TVITST) GO TO 3907
 43           J=2
 44           KTEMP1=3
 45           GO TO 3000
 46 3007      J=3
 47           KTEMP1=2
 48           GO TO 3008
 49 3020      DELFT=FDEM-FTOTAC
 50 C         ALL FLOWS ARE COMPUTED
 51           IF.NOT.(SINGV) GO TO 3400
 52 C         SINGLE VALVE MODE
 53 C         GV FLOW DEMAND
 54 3021      FTGTD=FTGTD + DELFT*2/NOGV
 55           VTSING=.TRUE.
 56           ITFLAG=.TRUE.
 57           GO TO 1000
 58 C
 59 C         INSERT FOLOWING STATEMENT TWO LINES ABOVE STATEMENT 1030
 60           IF(VTSING) GO TO 3021
 61           IF(VTSEQ) GO TO 3461
 62 3021     FTEMP3=VPOZD/CONV
 63           VTSING=.FALSE.
 64           ITEMP3=INT(FTEMP3)
 65           DO 3025 I=KTEMP1,N.2
 66           IGVAO(I)=ITEMP3-IGVAO(I)
 67           IF(IGVAO(I).GE.0.) GO TO 3022
 68           MODCH =.TRUE.
 69           GO TO 3025
 70 3022      IGVAD(1)=ITEMP3
 71 3025      CONTINUE
 72           GO TO 999
 73 C         SEQUENTIAL MODE
 74 3400      (TV1TST) GO TO 3401
 75           L=1
 76           J=2
 77           GO TO 3402
 78 3401      L=2
 79           J=1
 80 3402      FTEMP3=NOGV/2
 81           FTEMP1=DELFT/FTEMP3
 82           DFLOW=0,
 83 3412      DO 3500 I=1, NOGV,2
 84           IF (DELFT ,LT. 0.) GO TO 3403
 85 C         SCAN VALVES IN FIRING ORDER
 86 C
 87           KCNT1 =ICOMLS(J)
 88           J=J+2
 89           GO TO 3404
 90 C         REVERSE FIRING ORDER
 91 3403      KCNT1 =ICOMLS(NOGV-L+2)
 92           L=L+2
 93 3404      FTGTD(KCNT1)=FACT(KCNT1)+FTEMP1 +DFLOW/FTEMP3
 94           IF (FTGTD(KCNT1).GT.FVNX(KCNT1)) GO TO 3450
 95           IF (FTGTD(KCNT1).GT. 0.) GO TO 3440
 96           GO TO 3460
 97 3450     DFLOW=FTGTD(KCNT1)-FVMX(KCNT1)
```

APPENDIX-continued

```
 98          FTGTD(KCNT1)=FVMX(KCNT1)
 99          FTEMP1=FTEMP1-1.
100          GO TO 3460
101  3440    DFLOW = FTGTD(KCNT1)
102          FTGTD(KCNT1) = 0.
103          FTEMP1=FTEMP1-1
104  3460    VTSEQ =.TRUE.
105          GO TO 1000
106  3461    FTEMP3=VPOZD/CONV
107          VTSEQ =.FALSE.
108          IGVAO(KCNT1)= INT (FTEMP3)
109  3500    CONTINUE
110          MODCH=.TRUE.
111          GO TO 999
112          INSERT BETWEEN STATMENT 226 AND 229
113          IF (VTST) GO TO 3000
114  C       NEW VARIABLES FOR VALVE TEST
115          LOGICAL TV1TST       TV1 IN TEST
116          LOGICAL ITFLAG       AUXILIARY FLAG
117          INTEGER TESTAO
118          REAL DFLOW
119          LOGICAL VTSING, VTSEQ
120          LOGICAL VTST
SEXIT
```

We claim:

1. A system for testing a main steam inlet valve for a steam turbine by closing and opening the valve during operation of the turbine without disturbing the required flow of steam to the turbine for a predetermined load, comprising:
 a. a main steam inlet valve;
 b. at least one position controllable valve downstream of the main inlet valve;
 c. at least one position controllable valve connected to control the flow of steam to the turbine in a path parallel to the main inlet valve;
 d. means to generate a representation of total steam flow demand to the turbine;
 e. means to select in the alternative a single and sequential mode of operation for the position controllable valves;
 f. means governed by the total steam flow demand representation to generate for each of the position controllable valves a representation of valve lift, said representation being based upon a characterization of valve steam flow versus valve lift in accordance with the selected single or sequential mode of operation;
 g. means governed by the initiation of a valve test for the main steam inlet valve to generate repetitively a predetermined position demand representation of incremental closure of the downstream position controllable valve;
 h. means governed by generated representations including the incremental closure representation to generate a representation of actual flow for the downstream valve based upon the characterization of valve steam flow versus valve lift;
 i. means governed by each representation of actual flow and the total steam flow demand representation to generate a representation of flow demand error created by the generated representation of incremental closure;
 j. means governed by each flow demand error representation to generate a representation of valve position demand for the position controllable valve in the parallel path, said governor valve position demand being based upon the characterization of steam flow versus valve lift;
 k. means to position each of the position controllable valves in accordance with each generated respective downstream position demand and the parallel path position demand representations; and
 l. means to close and open the main inlet valve when the downstream valve is closed.

2. A system according to claim 1 wherein the valve position demand representation means includes means to generate a representation of flow demand in accordance with the representation of actual flow and the flow demand error representation.

3. A system according to claim 1 wherein the means to position each of the position controllable valves comprises a sequential input and a single input for operating the valves in the selected mode, said valves being positioned in accordance with the algebraic sum of the values on said inputs; and means to change the respective sequential input value in response to the generated representation of position demand for the downstream and parallel path position controllable valves.

4. A system for testing a main steam inlet valve for a steam turbine by closing and opening the valve during operation of the turbine without disturbing the required flow of steam to the turbine for a predetermined load, comprising:
 a. a main steam inlet valve;
 b. a first plurality of position controllable valves downstream of the main inlet valve;
 c. a second plurality of position controllable valves in a path parallel to the main steam inlet valve;
 d. means to generate a representation of total steam flow demand to the turbine;
 e. means to select in the alternative a single and sequential mode of operation for the position controllable valves;
 f. means governed by the selection means and the total demand representation to generate for each of the first and second plurality of valves a representation of valve position, said representation being based upon a characterization of valve steam flow versus valve lift depending on the total demand representation and the selection means;
 g. means responsive to the valve position demand representation and the selection means to generate for each of the first and second plrurality of valves a signal, the value of which determines the position of its respective valve;

h. means responsive to the initiation of a valve test to generate repetitively a position demand representation of incremental closure for each of the first plurality of valves;

i. means governed by the representation of total steam flow demand and each representation of incremental closure to generate a representation of total steam flow demand error to the turbine;

j. means governed by each generated total steam flow demand error representation to generate for each of the second plurality of valves a representation of valve position demand, each said representation being based upon a characterization of valve steam flow versus valve lift in accordance with the total steam flow and selected operating mode; and k. means to govern the signal generating means to change the position of its respective valve in response to each position demand representation.

5. A system according to claim 4 wherein the means to generate the total steam flow demand error representation comprises:

a. means to generate a representation of actual position for the first plurality of valves in accordance with each representation of incremental closure;

b. means to generate a representation of actual flow for each of the first plurality of valves in accordance with a predetermined characterization of steam flow versus valve lift; and c. means to generate the flow demand error in accordance with the generated actual flow and representation of total flow demand.

6. A system according to claim 4 wherein the first and second plurality of valves are in the sequential mode, and said means to generate for each of the second plurality of valves a representation of valve position demand comprises:

a. means to generate repetitively for a selected one of the second plurality of valves a representation of flow demand in accordance with each generated representation of actual flow and flow error until the selected valve is at limit position;

b. means to generate repetitively for another selected one of the second plurality of valves a representation of target flow at times when the flow demand representation is beyond the limits of valve opening for the first selected valve; and c. means governed by the target flow representation to generate the representation of valve position demand in accordance with the flow demand representation for the other selected valve.

7. A system according to claim 4 wherein the signal generating means comprises a first output for each of the valves to control the valves in accordance with a selected signal valve mode, a second output for each of the valves to control the valves in accordance with a selected sequential valve mode, means to combine the first and second outputs to control the valves, and means to apply the position demand representations generated during initiation of a valve test to change the value of the second output only.

8. A system according to claim 1 wherein the representation generating means is structured in a programmed digital computer.

9. A system according to claim 4 wherein the representation generating means is structured in a programmed digitial computer.

10. A system according to claim 2 wherein the representation generating means is structured in a programmed digital computer.

11. A system according to claim 5 wherein the representation generating means is structured in a programmed digital computer.

12. A system according to claim 6 wherein the representation generating means is structured in a programmed digital computer.

13. A system for testing a main steam inlet valve for a steam turbine by closing and opening the valve during operation of the turbine without disturbing the required flow of steam to the turbine for a predetermined load, comprising:

a. a main steam inlet valve;

b. a first plurality of position controllable valves downstream of the main inlet valve;

c. a second plurality of position controllable valves in a path parallel to the main steam inlet valve;

d. means to generate a representation of total steam flow demand to the turbine;

e. means to calculate a predetermined characterization of steam flow versus valve lift position;

f. means to generate a predetermined incremental change representation for each of the first plurality of valves;

g. means governed by the initiation of a main steam inlet valve test and each incremental change representation to generate a representation of flow for each of the first plurality of valves in accordance with the predetermined characterization;

h. means governed by the total flow demand representation and each generated representation of flow to generate a representation of flow demand for each of the second plurality of valves;

i. means governed by each representation of flow demand for the second plurality of valves to generate a representation of valve position demand for each of the second plurality in accordance with the predetermined characterization, and j. means to position the valves in accordance with each generated incremental change representation and each valve position demand representation.

* * * * *